(12) United States Patent
Adler et al.

(10) Patent No.: US 8,718,578 B2
(45) Date of Patent: May 6, 2014

(54) CIRCUIT ARRANGEMENT WITH IMPROVED DECOUPLING

(75) Inventors: Bernd Adler, Neubiberg (DE); Zdravko Boos, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/607,063

(22) Filed: Sep. 7, 2012

(65) Prior Publication Data

US 2013/0002370 A1  Jan. 3, 2013

Related U.S. Application Data

(60) Continuation of application No. 13/165,942, filed on Jun. 22, 2011, now Pat. No. 8,265,571, which is a division of application No. 11/731,398, filed on Mar. 30, 2007, now Pat. No. 7,983,627.

(51) Int. Cl.
*H01Q 11/12* (2006.01)
*H04B 1/04* (2006.01)

(52) U.S. Cl.
USPC ............. 455/126; 455/67.11; 455/67.13; 455/68; 455/69; 455/522; 455/78; 455/82; 455/115.1; 455/115.3; 455/120; 455/121; 455/226.1; 455/226.2; 333/109; 333/124; 343/850; 343/852; 343/860; 343/861

(58) Field of Classification Search
USPC ......... 455/78–83, 552.1, 553.1, 67.11, 67.13, 455/226.1–226.3, 68–70, 522, 115.1, 115.3, 455/120, 121, 126; 333/1.1, 100–109, 124; 343/850, 852, 860, 861
See application file for complete search history.

(56) References Cited

U.S. PATENT DOCUMENTS

| | | | | |
|---|---|---|---|---|
| 3,676,803 A * | 7/1972 | Simmons | ....................... | 333/1.1 |
| 4,496,915 A * | 1/1985 | Mathew et al. | ................ | 333/1.1 |
| 6,643,522 B1 * | 11/2003 | Young | ....................... | 455/552.1 |
| 7,242,911 B2 * | 7/2007 | Yu | .................................. | 455/78 |
| 7,373,115 B2 * | 5/2008 | Monroe | ......................... | 455/82 |
| 2004/0009754 A1 * | 1/2004 | Smith, Jr. | ....................... | 455/82 |
| 2004/0026832 A1 | 2/2004 | Gier et al. | | |
| 2005/0042989 A1 * | 2/2005 | Ho | .................................. | 455/78 |
| 2005/0245216 A1 * | 11/2005 | Boos | ............................. | 455/129 |
| 2005/0255812 A1 * | 11/2005 | Na et al. | ............................ | 455/78 |
| 2006/0025088 A1 * | 2/2006 | Pietig et al. | ................... | 455/121 |
| 2006/0040620 A1 * | 2/2006 | Jung et al. | ....................... | 455/82 |

(Continued)

FOREIGN PATENT DOCUMENTS

| | | | |
|---|---|---|---|
| EP | 1521379 A1 | 4/2005 | |
| EP | 1684438 A2 | 7/2006 | |
| FR | 2696889 A3 | 4/1994 | |

OTHER PUBLICATIONS

European Search Report dated Mar. 30, 2011 in connection with application No. EP 08 15 3226, p. 1-7.

(Continued)

*Primary Examiner* — Tuan A Tran
(74) *Attorney, Agent, or Firm* — Eschweiler & Associates, LLC

(57) ABSTRACT

A circuit arrangement includes a component having a closed signal path, that closed signal path connected to a first port, a second port and at least a third port. The component has a directed signal flow of a signal applied to one of that ports. Such a coupling device can be connected to a transmitter and to a receiver path, respectively.

13 Claims, 5 Drawing Sheets

(56) References Cited

U.S. PATENT DOCUMENTS

2006/0125602 A1* 6/2006 Posamentier et al. ....... 340/10.3
2006/0223456 A1* 10/2006 Ouzillou ..................... 455/78
2007/0161357 A1* 7/2007 Tudosoiu et al. ............ 455/129

OTHER PUBLICATIONS

U.S. Appl. No. 11/731,398, filed Mar. 30, 2007. 37 Pages.
Non-Final Office Action Dated May 14, 2010 for U.S. Appl. No. 11/731,398. 8 Pages.
Notice of Allowance Dated Mar. 18, 2011 for U.S. Appl. No. 11/731,398. 10 Pages.
U.S. Appl. No. 13/165,942, filed Jun. 22, 2011. 27 Pages.
Non-Final Office Action Dated Sep. 15, 2011 for U.S. Appl. No. 13/165,942. 13 Pages.
Final Office Action Dated Feb. 2, 2012 for U.S. Appl. No. 13/165,942. 9 Pages.
Notice of Allowance Dated May 14, 2012 for Application No. 113/165,942. 9 Pages.

* cited by examiner

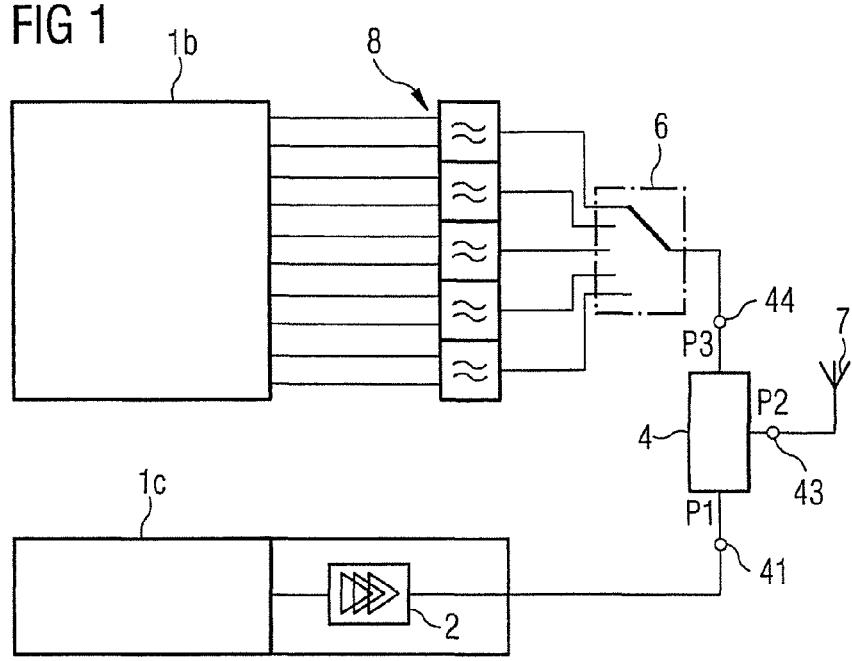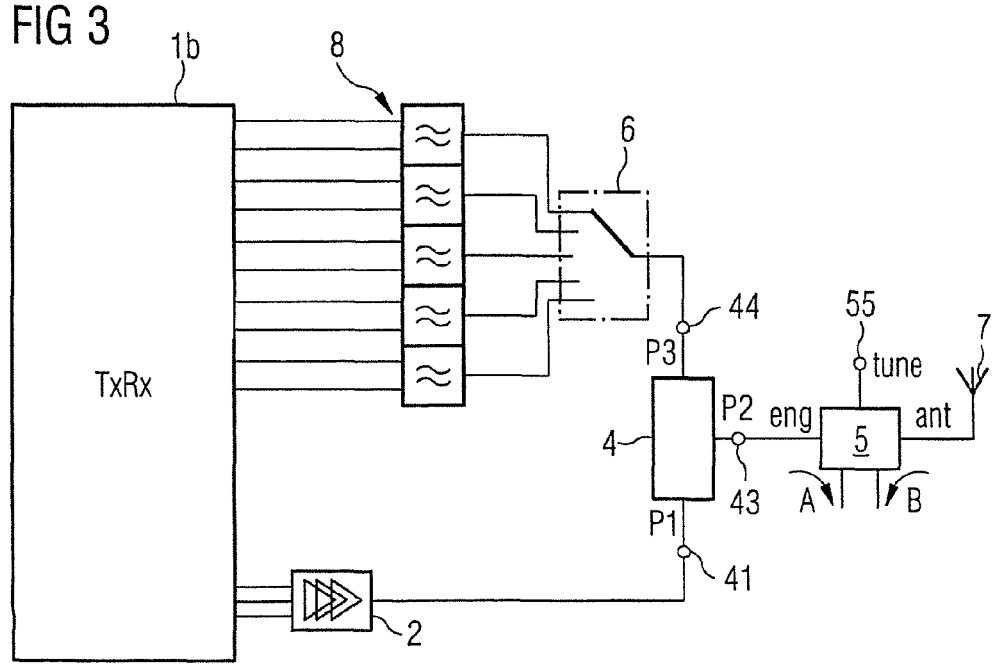

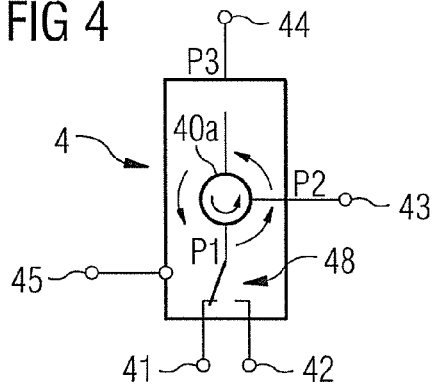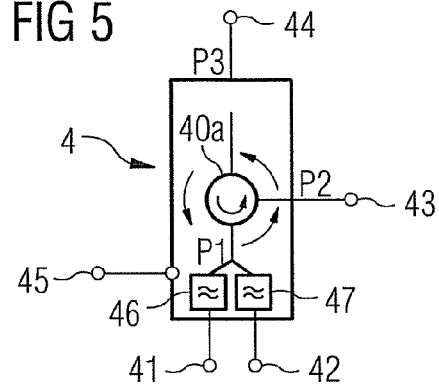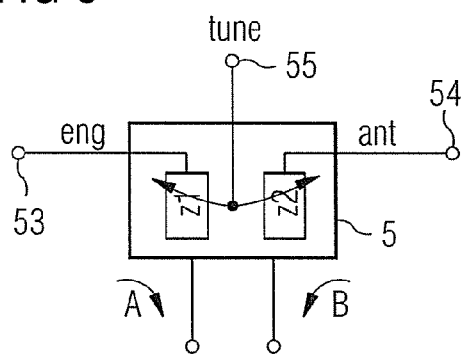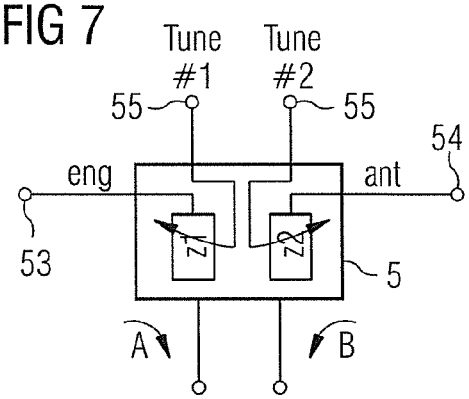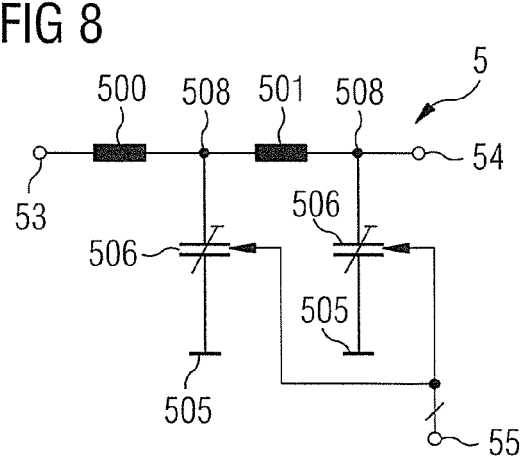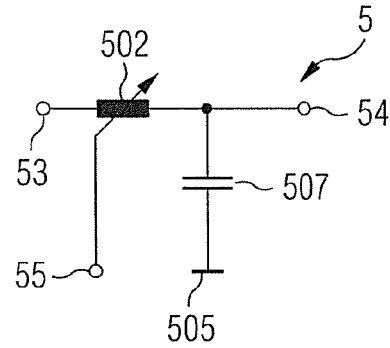

CIRCUIT ARRANGEMENT WITH IMPROVED DECOUPLING

RELATED APPLICATION

This application is a continuation of U.S. application Ser. No. 13/165,942, filed on Jun. 22, 2011, which is a divisional of U.S. application Ser. No. 11/731,398, filed on Mar. 30, 2007, which issued as U.S. Pat. No. 7,983,627, on Jul. 19, 2011.

FIELD OF THE INVENTION

The invention relates to a circuit arrangement, particularly in the field of telecommunication.

BACKGROUND

Modern telecommunication standards often require a simultaneous transmission and reception of signals. For example, the third generation communication standard Wideband CDMA/UMTS (Wideband Code Division Multiple Access, Universal Mobile Telecommunication System) uses a frequency division duplex (FDD) method to transmit continuous signals while receiving signals on a different center frequency simultaneously. According to the specification of the UMTS standard a total number of at least nine different operating bands are specified. In each operating band, a first frequency range is specified for transmitting signals by a user device to be received by a base station. Concurrently, a second frequency range is specified for the base station. The transmitted signals are received by the user device. Because the specification requires a good signal quality for an error-free signal reception, it is necessary to suppress any interfering signal coming from an external source or from simultaneous transmitted signals sufficiently. It is also expected that more frequency operating bands will be added into existing communication standards or new standards with new operating bands will be specified in the future.

BRIEF DESCRIPTION OF THE DRAWINGS

The invention is explained in detail below using exemplary embodiments with reference to the drawings in which
FIG. 1 shows a first embodiment of the invention,
FIG. 3 shows a third embodiment of the invention,
FIG. 4 shows first embodiment of a circulator arrangement,
FIG. 5 shows a second embodiment of a circulator arrangement,
FIG. 6 shows a first embodiment of a tunable matching network,
FIG. 7 shows a second embodiment of a tunable switching network including a directional coupler,
FIG. 8 shows a third embodiment of a tunable matching network,
FIG. 9 shows a fourth embodiment of a tunable matching network.

DETAILED DESCRIPTION

Figure 2:
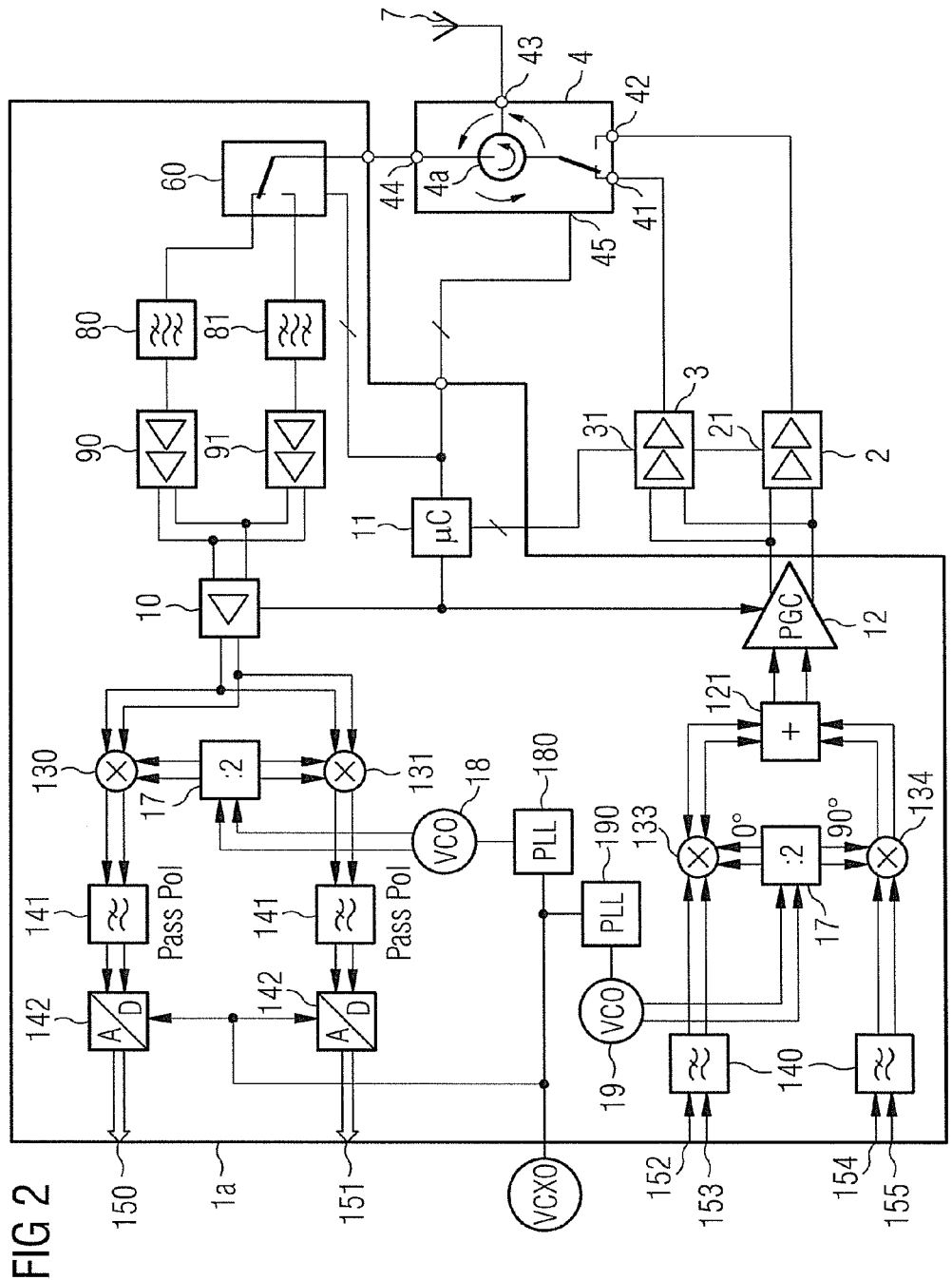
FIG. 2 shows a second embodiment of the invention.

In the following description, further aspects and embodiments of the present invention are disclosed. In addition, reference is made to the accompanying drawings which form a part hereof, and in which is shown by way of illustration in which the invention may be practiced. The embodiments of the drawings present a discussion in order to provide a better understanding of one or more aspects of the present invention. The disclosure is not intended to limit the feature or key elements of the invention to a specific embodiment. Rather, the different elements, aspects, and features disclosed in the embodiments can be combined in different ways by a person skilled in the art to achieve one or more advantages of the present invention. It is to be understood that other embodiments may be utilized and structural or logical changes may be made without departing from the scope of the invention. The elements of the drawings are not necessarily to scale relative to each other. For illustration purposes, some frequency ranges and communication standards are specified. The ranges as well as the communication standards referred to are not restricted to the embodiment disclosed herein. Other frequency and power ranges or communication standards can also be used to achieve the different aspects of the present invention. Like reference numerals may designate corresponding similar parts.

Figure 13:
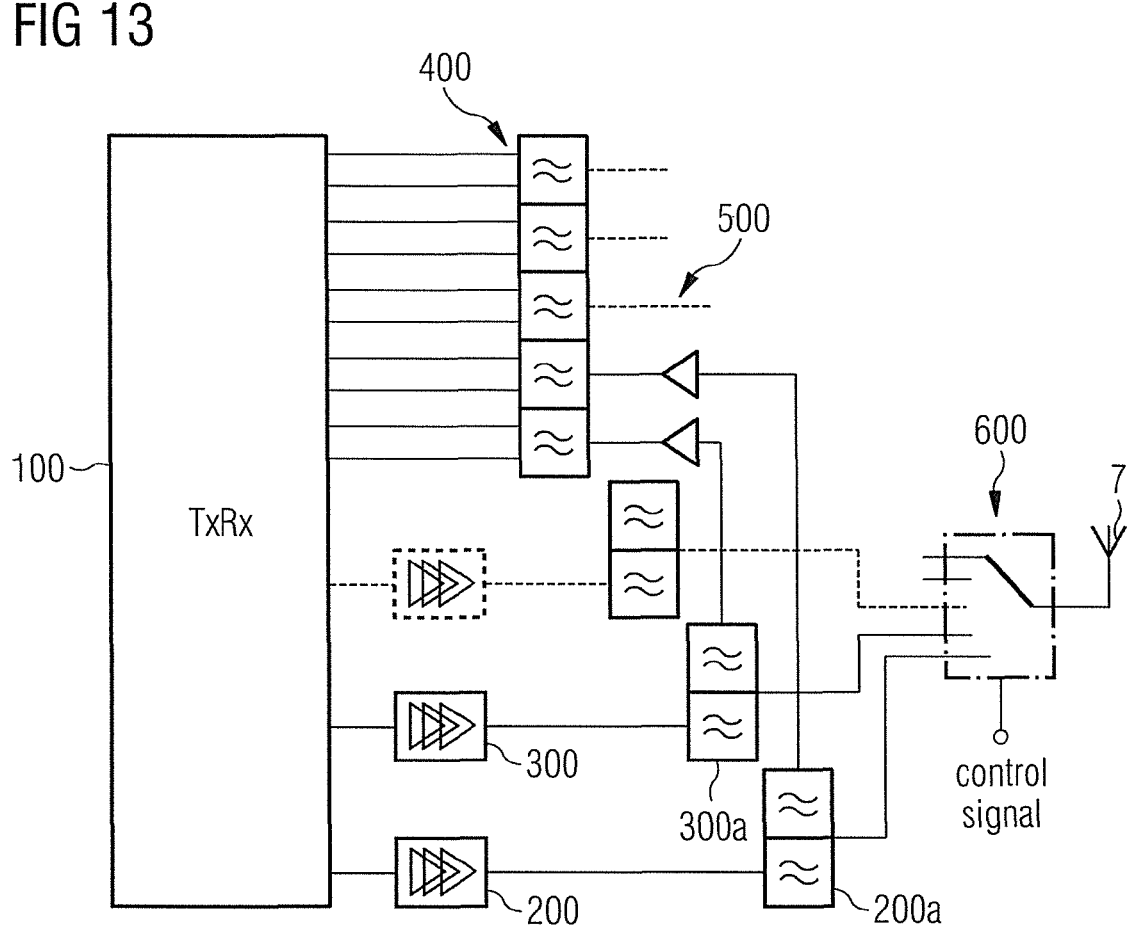
FIG. 13 shows a known transceiver arrangement.

In current transceiver arrangements, often a plurality of signal paths for transmitted signals and received signals are used. FIG. 13 shows a circuit arrangement comprising a transceiver 100. The transceiver 100 is connected to a plurality of signal paths of which only two are shown for illustration purposes. Each of the signal paths comprises a power amplifier arrangement 200 and 300, respectively. Each of the paths comprising the respective power amplifiers is configured to amplify signals in a specific operating band. While only two paths are shown, further paths, as indicated by the dotted path, may be added, depending on the requirements of the communication standard for which the transceiver is used.

The output of the amplifiers 200 and 300 are connected to duplex filters 200a and 300a, respectively. These duplex filters 200a, 300a comprise a pass-band characteristic having steep edges to sufficiently suppress interfering signals in adjacent channels. The duplex filters may comprise in one embodiment at least two band-pass filters with different filter characteristics and pass-bands. One output of each duplex filter 200a, 300a is connected to a terminal of a duplexer unit 600, coupling one of its input terminals to a common output terminal in response to a control signal. The output terminal is connected to an antenna for receiving and transmitting signals. In operation, an amplified signal is filtered and applied to one of the inputs of unit 600 for transmission. Simultaneously the amplified signal is suppressed by a second band-pass filter to prevent signal flow to a low noise amplifier 500 connected thereto. A received signal in a different frequency range is suppressed by the first band-pass filter of the respective duplex filters 200a, 300a but passed by the second one to the low noise amplifier 500. The low-noise amplifiers 500 are connected to a plurality of band-pass filters 400 with a pass-band characteristic enclosing the frequency range of the corresponding operating band.

In the arrangement of FIG. 13, the transfer requirements of the switch with respect to, for example, linearity are very tough because a high-power transmission signal is passing through the switch while at the same time a low-power signal and a number of external interferers are received, filtered and applied to the corresponding low-noise amplifier 500. Consequently, the duplex filters 200a and 300a require steep flanks or edges and sufficient suppression in adjacent channels not only for the band-pass filter of the receiver path but also for the band-pass filter in the transmitter path because interference signals may change the reflection behavior of the antenna causing reflection at the output of the power amplifiers 200 and 300.

The proposed circuit arrangement comprises a transmitter path to provide an RF-signal, a receiver path to receive an RF-signal, and an antenna signal path. A coupling device coupled with a first port to the transmitter path, with a second port to the antenna signal path and with a third port to the receiver path comprises signal suppression characteristic for a signal flowing from the first port to the third port and for a signal from the second port to the first port.

The proposal relaxes the requirements for elements in the transmitter and receiver path with respect to linearity and adjacent channel suppression because a signal to be transmitted does not pass to the receiver side. Further, any signal received at the second port is suppressed when applied to the first port. Due to the directed signal flow of the coupling device, a signal provided at one port is suppressed when flowing into the opposite direction. Consequently, a signal applied to the first port is directed to the second port while being suppressed at the third port. A signal applied at the second port is suppressed with respect to a first port but let passed to the third port.

In a further embodiment, the coupling device may comprise a circular signal path, the signal path comprising a directed signal flow of a signal applied to one of the first, second and third port. In accordance with another embodiment, the coupling device comprises a circular conductor loop having the first, second, and third port arranged with an angle of approximately 120° to each other. The conductor loop may also be annular. In an embodiment, the coupling device comprises a circulator.

In accordance with another embodiment, the transmitter path may comprise a first power amplifier to amplify a signal having a first center frequency and at least a second power amplifier to amplify a signal having a second center frequency. The power amplifiers may be coupled to the first port of the coupling device. In one embodiment, a switch may be disposed between the first and at least one second power amplifier and the first port of the coupling device. In another embodiment, band-pass filters may be disposed between the respective power amplifiers and the first port of the coupling device. With the additional band-pass filters arranged on the output of the power amplifiers, harmonic portions caused by the amplification process may be suppressed and adjacent channel leakage power reduced.

Another embodiment of the invention relates to a reduction of interference signals in the receiver path. In this embodiment, a first and at least a second filter may be arranged between a third port of the coupling device and the receiver path. The first and at least one second filter may comprise a band-pass filter having a pass-band within different frequency regions. These frequency regions may be overlapping or non-overlapping. In accordance with another embodiment, a switch or a duplexer may be disposed between the third port of the coupling device and the receiver path to apply a signal provided by the third port of the coupling device to one of at least two sub-paths of the receiver path in response to a control signal. Consequently, a sub-path of the receiver path can be selected in response to the control signal connecting the respective sub-path to the third port for processing a received signal provided at the third port of the coupling device. Each of the sub-paths of the receiver path may comprise a filter and/or a low noise amplifier. The filter may have different pass-bands. In a further embodiment, the control signal may be derived from a center frequency of the signal provided at the third port.

In yet another embodiment of the invention, the antenna signal path may comprise an antenna and a directional coupler disposed between the second port and the antenna. With a directional coupler, reflection and transmission coefficients of the third port can be determined and the results used for controlling the transmitter or receiver path of the circuit arrangement. In a further embodiment, the antenna signal path may also comprise a matching circuit to match the impedance of an antenna to an impedance on the first and third port of the coupling device. The matching network may be tunable by a control word, which, for example, can be provided by a signal derived from the results of the directional coupler. With a matching network coupled at least to the second port of the coupling device, the transmission and suppression characteristics may be improved.

In yet another embodiment, a circuit arrangement may comprise a transceiver to provide a transmission signal on at least a first transmission terminal and to receive a signal on at least one terminal of a plurality of reception terminals. A circulator is coupled to the at least one first transmission terminal and to the plurality of reception terminals. A matching network may be coupled to the circulator to match an impedance of an antenna to an impedance of the at least one first transmission terminal and the at least one terminal of the plurality of reception terminals coupled to the circulator. The matching network coupled to the circulator reduces any antenna mismatch and, consequently, prevents signal components of the transmission signals to be applied to one of the reception terminals.

In a further embodiment, band-pass filters may be disposed between the reception terminals and the circulator. Each of the band-pass filters may comprise a different pass-band. In another embodiment, the transceiver may comprise a first transmitter path to provide a transmission signal having a first center frequency and at least one second transmitter path to provide a transmission signal having a second center frequency. Both transmitter paths may be coupled to the circulator.

In one embodiment, both transmitter paths are coupled to the circulator by a first band-pass and a respective second band-pass filter. Such filters may be disposed between an output of the transmission paths and a first port of the circulator. In another embodiment, the circuit arrangement may comprise a switch having an output connected to the first port of the circulator and a plurality of inputs, each input connected to one of the respective first and at least one second transmitter paths. The switch is configured to connect the output to one input of the plurality of inputs in response to a control signal. In yet another embodiment, a switch may also be arranged between the circulator and the plurality of reception terminals. The switch may connect the third port of the circulator to one terminal of the plurality of the reception terminals in response to a control signal. Both control signals for the switches can be derived from a center frequency of the received signal, for example.

In yet another embodiment, a circuit arrangement comprises a circuit, the circuit having a closed signal path, the closed signal path connected to a first port, a second port and at least a third port. The closed signal path comprises a directed signal flow of a signal applied to one of said first, second and third ports. A tunable matching network is connected to the second port to match an impedance of a device coupled thereto to an impedance of at least a first device coupled to the third port. In one embodiment, the circuit may comprise a circular or ring-shaped conductor loop having the first, second, and third port arranged with an angle of approximately 120° to each other. In such circuit arrangement, the circuit with the conductor loop comprises a transmitting path between the first and the second port and the second and third port while having a broadband suppression between the first and third port as well as between the second port and the first port. In one embodiment, the component comprises a circulator having, for example, a Faraday rotator. In yet another embodiment, the circular conductor loop may be surrounded by a ferrite material resulting in different propagation velocities, thereby canceling of waves propagating over two different paths. The component may be based on a strip line cable or a micro strip.

FIG. 1 shows a first embodiment illustrating various features of the invention. The circuit arrangement according to FIG. 1 comprises a transmitter path 1c including a power amplifier chain 2. The transmitter path 1c may comprise in one embodiment circuits and devices for signal base band processing as well as for frequency conversion to provide an RF-signal within the desired frequency range. For example, the transmitter path 1c may comprise an IQ-modulator, an OFDM-modulator, a polar transmitter, a polar modulator and the like. Base band signal processing as well as frequency conversion can be implemented in an integrated circuit having an output connected to the amplifier chain 2.

The amplifier chain 2 comprises one or a plurality of amplifiers connected in series. Often, the power amplifier chain 2 is a separate arrangement due to the generation of high signal power, which may interfere with other devices or circuits of the transmitter path. However, it is also possible in one embodiment to implement some or all amplifiers of the power amplifier chain 2 within an integrated circuit also comprising other signal processing circuitry. Some or all of the amplifiers of the power amplifier chain 2 may comprise a tunable amplification gain, which can be controlled by a microprocessor of the transmitter path. The output of the last power amplifier of the power amplifier chain 2 of the transmitter path 1c is coupled to a first input terminal 41 of a circulator 4.

The circulator 4 is implemented in one embodiment as a three port "turnstile" or Y-junction circulator based on cancellation of waves propagating over two different paths near a magnetized material. The output of the power amplifier chain 2 is connected to a first port P1 of the circulator 4 at input terminal 41. A second port P2 of the circulator 4 at terminal 43 is coupled to an antenna 7 for transmitting signals generated by the transmitter path 1c. The circulator 4 further comprises a third port P3 at terminal 44 that is connected to a first duplexer switch 6. The input of the duplexer switch 6 is connected to one of a plurality of output terminals of switch 6 in response to a control signal.

Each of the output terminals of the duplexer switch 6 is connected to a filter 8 having a pass-band transfer characteristic within a specific frequency region. In one embodiment, these regions are selected according to the specification of a mobile communication standard. For example, the band-pass characteristic of the filters 8 are in accordance to the frequency regions defined in the different operating bands of the WCDMA mobile communication standard. The band-pass filters 8 further transform an unbalanced, also called single-ended signal provided by the circulator 4 and the switch 6 to a balanced or double-ended differential signal applied to a receiver path 1b. The receiver path 1b may comprise low-noise amplifiers and frequency conversion circuitry to convert a signal provided by one of the filters 8 to a down-converted signal for further signal processing like, for example, base band filtering, analog-to-digital conversion and demodulation.

The circulator 4 as used in the embodiment of FIG. 1 may be a passive electronic component with three or more ports. The ports can be accessed in such an order that when a signal is fed into any port, it is transferred to the next port, the first being counted as following the last in numeric order. Due to the cancellation of waves propagating over two different signal paths near a magnetized material, a circulator provides a directed signal flow resulting in transmitting a signal from one port to the following port but providing a broadband isolation for signals flowing in the opposite direction.

There are various ways of implementing a three port Y-junction circulator and all alternatives are contemplated as falling within the scope of the invention. In a three port ferrite circulator, there are three transmission lines spaced radially about a general cylindrical ferrite element subject to an appropriate magnetic field. Electromagnetic energy transmitted toward the ferrite element along a first transmission line is transmitted out along the next adjacent line, spaced approximately 120° apart. If there are more transmission lines, they are connected to a center area with generally equal angles in degrees apart. The transmission line may be microstrip lines, waveguides or metallic strip spaced from a ground plane by a dielectric layer.

In the circulator 4, a signal at the first port P1 and terminal 41 circulates to the second port P2 while being suppressed at the third port P3. A signal at the second port P2 is passed to the third port P3 and terminal 45 but is suppressed in the direction of the first port P1. As a result, a circulator 4 suppresses any amplified signal by the transmitter path 1c from being provided at the third port. The characteristics to suppress transmitted signal and transmitter noise in the receiver direction at terminal 44 and interferers coming from the antenna 7 in the transmitter output direction at terminal 41 relax the requirements of the switch 6 and the duplexers 8 connected downstream. In addition, reflection in the transmitter path due to mismatch at the output of the amplifier may be reduced.

When a signal is received via the antenna 7 according to the WCDMA mobile communication standard for example, the center frequency of the received signal may be known to the microprocessor within the receiver path 1b. The microprocessor provides a control signal to the duplexer switch 6 connecting the third port P3 of circulator 4 at terminal 44 to one of the filters 8 having a pass-band transfer characteristic corresponding to the center frequency of the received signal. Interferers outside the frequency region of within the received signal as well as the signal components provided simultaneously by the transmitter path 1c are suppressed by the circulator 4 and the filters 8.

FIG. 2 shows a further embodiment of a circuit arrangement, in which the receiver path and the portions of the transmitter path are implemented in an integrated circuit 1a. The integrated circuit 1a shown herein comprises circuits for analog signal processing. Data processing like demodulation or modulation is implemented in a base band circuit arrangement connected to circuit 1a in one embodiment. The integrated circuit 1a comprises a transmitter path having differential inputs 152 to 155 for balanced analog I/Q signals. Such I/Q signals represent the data to be transmitted and are up-converted by an I/Q modulator to the desired frequency range. For this purpose, the I/Q-modulator comprises a first mixer 133 and a second mixer 134. The first mixer 133 is connected with its first input to a base band filter 140, which suppresses harmonic and non-harmonic spurious signal components in the I-component of the signal to be transmitted. In accordance, the second mixer 134 of the I/Q modulator is coupled to a base band filter 140, the filter 140 connected to terminals 154, 155 for receiving the Q-component as well.

Local input terminals of mixers 133 and 134 are connected to a frequency divider 17 coupled to a voltage controlled oscillator 19 providing an LO-signal. With the LO-signal at the local input terminals, the mixers 133, 134 convert the low frequency I- and Q-components to an RF signal at the desired frequency range. The divider 17 provides the required phase shift of 90° for the I/Q-modulation. The output of the mixers 133, 134 are connected to a circuit 121 adding both up-converted components and providing an RF-signal to a balanced pre-amplifier 12. The pre-amplifier 12 comprises an adjustable gain controlled by a microprocessor unit 11.

Depending on the center frequency of the signal to be transmitted, different power amplifier or power amplifier chains can be used. For this purpose, the output of the balanced pre-amplifier 12 is connected to a first power amplifier arrangement 2 and a second power amplifier arrangement 3. The amplifier arrangements 2, 3 also convert the balanced input signals to an unbalanced amplified output signal. Further, both power amplifier arrangements 2, 3 may comprise one or a plurality of power amplifiers connected in series, some or all of them having adjustable gain amplification. Accordingly, each of the power amplifier arrangements 2 and 3 comprise a control input 21, 31 for control words. The control inputs 21, 31 are connected to the microprocessor unit 11 of the integrated circuit 1a. The microprocessor unit 11 controls the amplification gain and the total output power. Depending on the center frequency of the signal to be transmitted, the power amplifier arrangement not required for amplification can be switched off by, for example, a proper biasing or separating the input of the arrangement not required from the pre-amplifier 12. A corresponding control word is provided by the microprocessor unit 11.

The unbalanced outputs of the power amplifier arrangements 2 and 3 are connected to respective input terminals 41, 42 of a circulator arrangement 4. The circulator arrangement 4 comprises a circulator 4a as well as a first switch coupling one of the input terminals 41 and 42, respectively, to the first port of the circulator 4a in response to a control word at terminal 45. The control word at terminal 45 is provided by the microprocessor 11 in one embodiment. The switch within the circulator arrangement 4 may be implemented as transmission gates, transistors, diodes or other switching elements. The circulator 4a of the circulator arrangement 4 comprises a second port connected to an antenna 7 by terminal 43 and a third port coupled to the output terminal 44 of the arrangement 4. The terminal 44 is connected to a further switching device 60 within the integrated circuit 1a.

In this embodiment, the switching device 60 comprises two outputs connected to a first band-pass filter 80 and a second band-pass filter 81, respectively. The output of the band-pass filters are coupled to low-noise amplifiers 90, 91 providing a low-noise amplification for the filtered signals and convert the unbalanced signals into balanced signals. The outputs of the low-noise amplifiers are connected to a further amplifier 10 with an adjustable gain. The amplifier 10 is used to adjust the amplitude of the received and amplified signal for the frequency down-conversion in the I/Q demodulator connected downstream.

For this purpose, the output of the amplifier 10 is connected to a first mixer 130 and a second mixer 131 of an I/Q-demodulator, each comprising local oscillator input terminals connected to a frequency divider 17. Its input is connected to a voltage controlled oscillator 18. The outputs of both mixers 130, 131 of the I/Q demodulator are connected to respective low-pass filters 141 for suppressing harmonics or sub-harmonics spurious generated during down conversion. The down-converted and demodulated components I and Q are provided at respective analog-digital converters 142. The outputs of the analog-digital converters 142 are connected to terminals 150 and 151.

During operation, the signals may be transmitted and received on different center frequencies simultaneously. Such operation mode is called frequency division duplex or FDD. The center frequencies according to an operating band as set forth in the mobile communication standard WCDMA are adjusted by the microprocessor 11 by setting the phase-locked loops 180 and 190 to proper values. The phase-locked loops are connected to voltage controlled oscillators 18 and 19 for providing balanced signals at double frequencies. These signals are applied to the dividers 17 in the I/Q-modulator and I/Q-demodulator, which divide the frequencies by the factor of two and provide a phase shift of 90° as indicated in FIG. 2.

While in this embodiment only two amplifier paths and receiver paths are shown for illustration, a plurality of amplifier and receiver paths are possible. For example, the WCDMA mobile communication standard in FDD mode specifies at least nine operating bands. Each operating band comprises a first frequency region for signals to be transmitted and a second different frequency region for receiving signals. In each frequency region of each operating band, one or several transmission or reception channels of 5 MHz bandwidth are specified. While some operating bands may comprise overlapping frequency regions, the frequency regions for transmission and reception in each operating band may be different. Other frequency regions may be used for different mobile communication standards.

As a result, the circuit arrangement may comprise a plurality of transmitter paths, each having at least some filters and/or power amplifiers. The circuit arrangement may also comprise a plurality of receiver paths each of them comprising filters and low-noise amplifiers connected thereto. Moreover, it is also possible to connect a first broadband low-noise amplifier between the output terminal of the circulator arrangement 4 and the input terminal of switch 60 in circuit 1a.

FIG. 4 shows one embodiment of a circulator arrangement 4 having a circulator 40a and switch 48 connected to the first port P1 of the circulator 40a. The switch 48 is implemented using transmission gates and controlled in response to a signal at control input terminal 45. The terminal 41, 42 can be connected to different circuits and devices, for example to different amplifiers or different transmission paths of a transmitter or transceiver. While in this illustration the switch 48 comprises only two input terminals 41, 42, a plurality of input terminals depending on the number of amplifier paths is possible.

FIG. 5 shows an alternative embodiment using band-pass filters 46 and 47 connected between the output of respective devices, like amplifiers of a transmitter path and the first port of the circulator 40a. The band-pass filters 46 and 47, respectively, provide a sufficient suppression for harmonic and other spurious signals and further relax the matching requirements between the first port P1 of the circulator 40a and the output terminal of the devices connected to terminals 41, 42. Further, while only two filters 46 and 47 are shown herein, a plurality of additional filters connected to the first port and to the respective power amplifiers are possible. As an alternative embodiment, matching networks can be disposed between the first port P1 of the circulator 40a and the respective terminals 41, 42. As an example, the matching networks may replace the filters 46 and 47, but can also disposed together with the filters between the port P1 and the terminals 41, 42. The matching network match the impedance of devices connected to terminals 41, 42 to an impedance of the circulator 40a or devices connected to the other port of circulator 40a.

The circulator arrangement according to FIG. 4 and FIG. 5 including the switches 48 or the band-pass filters 46 and 47 can be implemented as a single device, but also with discrete elements. Further, in another embodiment the switch 48 and the filters 46 and 47 can be separated from the circulator 40a.

With the use of a circulator, the antenna connected thereto can be used for simultaneous transmission and reception of signals. However, to provide a proper suppression by the circulator, the impedances on two respective ports of the circulator should match with each other. While the requirement of matching impedance can be achieved for the transmitter path and the receiver path with proper design, the impedance of an antenna connected to the second port of the circulator may vary due to external parameters.

Figure 12:
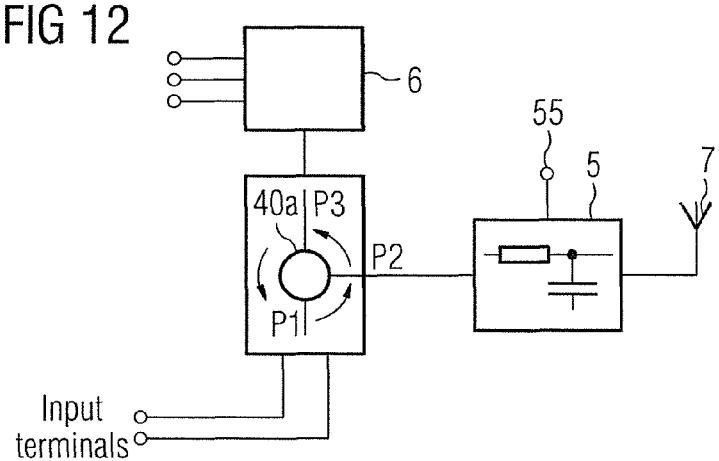
FIG. 12 shows a fourth embodiment the invention.

FIG. 12 shows an embodiment including devices for proper matching. The circulator 40a comprises a first port, which can be connected to a plurality of input elements, and a third port connected, for example, to a switching element 6. The impedances at the third port and the first port are matched. Matching between the elements at the third and first port can be achieved by proper design of the circuits connected thereto or additional matching networks arranged between the circuits and the first and third port, respectively. The second port P2 of the circulator is coupled in one embodiment to a tunable matching network 5, which is disposed between an antenna 7 and the second port of the circulator 40a. The tunable matching network 5 comprises a control terminal 55 for a respective control signal. If the impedance of the antenna 7 varies over time, the tunable matching network 5 will able to compensate the impedance change of antenna 7. With this arrangement, a matching impedance on each of the first, second, and third port of the circulator 40a is achieved resulting in a good transmission characteristic for signals from the first port P1 to the second port P2 as well as from the second port P2 to the third port P3 while at the same time providing a broadband suppression for signals flowing from the third port P3 to the first port P1 and from the second port P2 to the first port P1.

FIG. 3 shows an embodiment of a transmitter arrangement including a matching network 5 between the second port P2 of a circulator arrangement 4 at terminal 43 and the antenna 7. The matching network 5 shown in FIG. 3 comprises a directional coupler for decoupling a signal portion A in the forward direction as well as a portion B of the reflected signal. The signal portions A, B are used to calculate a reflection coefficient, said coefficient representing information about a mismatch of an impedance between ports P2 and port P1, P3 of the circulator arrangement 4. The matching network 5 also comprises a tuning input 55, which is connected to a control circuit within the transceiver device 1. A control word at terminal 55 may be applied in response to the measured reflection coefficients.

The transceiver device 1 comprises a plurality of output terminals for signals to be transmitted connected downstream to a power amplifier arrangement 2. The power amplifier arrangement 2 may comprise plurality of amplifier and a switch, its output coupled to the first port of the circulator via terminal 41. A third port P1 of the circulator within the circulator arrangement 4 is coupled to a switching device 6, connected downstream to a plurality of filters 8. During operation, a signal is amplified by the power amplifier arrangement 2 and transmitted by the antenna 7 while a signal received by the antenna 7 is applied to one of the filters 8. Transmitted and reflected power is measured by the directional coupler within the tunable matching network 5. If the reflection coefficient changes by external parameters influencing the impedance of antenna 7, a tuning control word is generated in response to the measured reflection coefficient change. The impedance mismatch of antenna 7 is corrected by the matching network 5 to the corresponding impedance at ports P1 and P3 of the circulator device 4.

FIG. 6 shows an embodiment of a tunable matching network 5 including a directional coupler for measuring a signal portion A in forward direction as well as a second signal portion B of the reflected signal in the opposite direction. In this embodiment, the tuning input 55 provides a common control word to different tuning elements of the matching network 5.

In the embodiment according to FIG. 7, a first and a second tuning input 55 is provided, each of the inputs connected to a separate tuning element of the matching network 5. Consequently, the matching network 5 may comprise a plurality of different tuning elements, which can be tuned separately or by a common tuning word.

FIG. 8 shows a further embodiment of a tunable matching network 5. The matching network 5 comprises two elements 500 and 501 connected in series between the input terminal 53 and the output terminal 55. Both elements 500, 501 comprise an inductance. Between the elements 500 and 501, a first node 508 is connected to a first tunable capacitor 506. A second terminal of the capacitor 506 is connected to ground terminal 505. A second node 508 between the second element 501 and the output terminal 54 is also connected to a tunable capacitor 506. Control terminals of the tunable capacitors 506 are connected to the tuning input 55 for a corresponding control word. The capacitors 506 can also be used in the embodiments according to FIGS. 6 and 7 as tuning elements.

Another embodiment with a tunable inductive element is seen in FIG. 9. The tunable inductive element 502 is connected between the input terminal 53 and the output terminal 54 of the matching network 5. Further, a fixed capacitor 507 is arranged between the output terminal 54 and the ground terminal 505. By changing the capacitance of the tunable capacitors according to FIG. 8 or the inductance of the tunable inductive element 502, the impedance of the matching network changes. Accordingly, the impedances of elements connected to terminals 53 and 54, respectively can be matched to each other. The tunable inductive device can be implemented in the matching networks according to FIGS. 6 and 7 as well.

Figure 10:
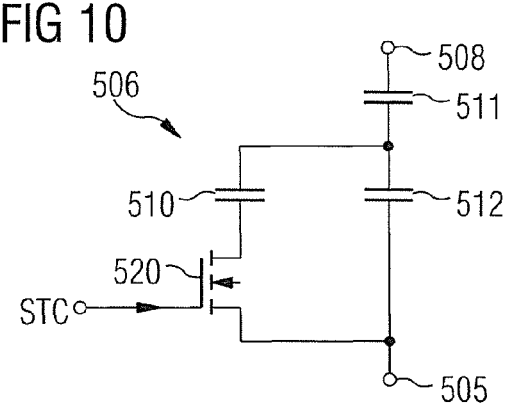
FIG. 10 shows a first embodiment of a tunable capacitive element for usage in a tunable matching network.

FIG. 10 shows an embodiment of a tunable capacitor 506, which can be implemented in the embodiment of FIG. 8 for example. The tunable capacitive element 506 comprises a first capacitor 511 and a second capacitor 512, connected in series between node 508 and ground terminal 505. A node between the capacitors 511 and 512 is coupled to a series circuit of a capacitor 510 and a switching transistor 520. The gate of the switching transistor 520 is coupled to the tuning input terminal 55 for the control bit STC. In response to the control bit STC, the capacitor 510 is switched parallel to the capacitor 512 resulting in an overall capacitance change of the element 506.

Figure 11:
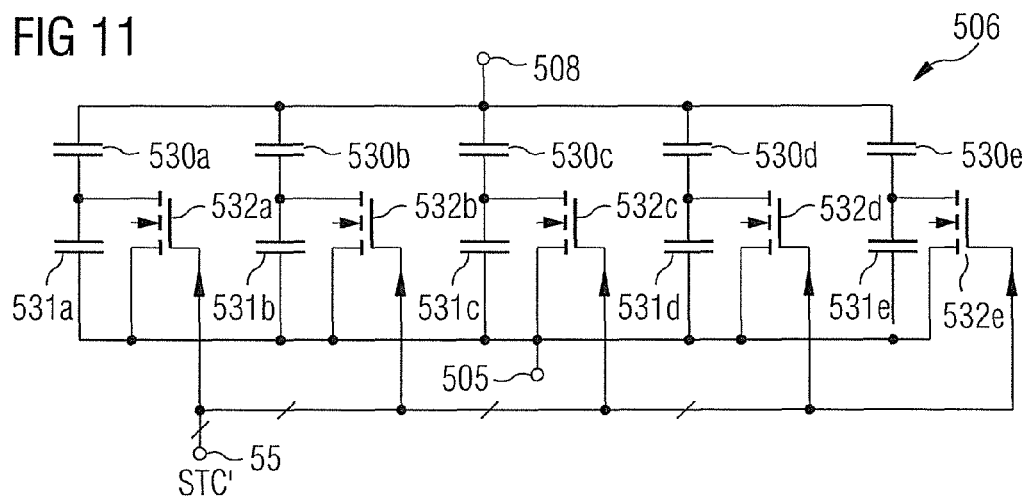
FIG. 11 shows a second embodiment of a tunable capacitive element.

FIG. 11 shows a further embodiment of a tunable capacitive element 506. In this embodiment, a plurality of pairs of capacitors 530a, 531a to 530e, 531e are arranged in parallel between the ground terminal 505 and node terminal 508. Between each pair of capacitors 530a, 531a to 530e, 531e, a node is connected to a first terminal of a respective switching transistor 532a to 532e. The second terminal of each switching transistor 532a to 532e is connected to a common ground terminal 505. The gates of the switching transistors 532a to 532e are connected to the tuning input terminal 55. With a proper control word STC' at the tuning input terminal 55, the capacitors 531a to 531e can be selectively switched on or off, thereby changing the overall capacitance of the element 506.

The tunable capacitive elements 506 shown in the embodiments according to FIG. 10 and FIG. 11 can also be implemented using varactor diodes. For example, the capacitors 530a to 530e and 531a to 531e in the embodiment according to FIG. 11 can be replaced by varactor diodes. Of course, other matching network circuitry also comprising resistive elements can be used. The embodiments of FIGS. 10 and 11 can be implemented in the matching networks according to the embodiments in FIGS. 6 to 8.

With the invention, a circulator is used to reduce the complexity of a duplex filter array in a multi-band communication system. The circulator already suppresses interfering signals coming from a transmitter in the receiver direction due to its directed signal flow characteristic. Additional interfering signals from the antenna applied to the receiver path can be sufficiently suppressed by corresponding band-pass filters in the receiver path. In addition, these filters may also further suppress any spurious signal induced by the transmitter. Because of the high transmitter path signal suppression due to the circulator and additional band-pass filters that can be arranged in the receiver path, the requirements for a low-noise amplifier or switches in the receiver path in respect to linearity may be reduced. The arrangement enables to use low power and coil less low-noise amplifiers. The terminals mentioned herein may be adopted to receive or provide unbalanced or balanced signals.

The low insertion loss of the circulator in addition to a possible antenna tuning network enables the transmitter signal path not only for third generation communication standards like WCDMA but also for second and 2.5 generation like GSM, EDGE or PCS as well as fourth generation (4G) mobile communication standards. In the case that power amplifiers with non-linear transfer characteristics are used, polar transmitters or S-class amplifiers are possible in the transmitter path.

The different features of the embodiments shown herein can be combined by one skilled in the art to achieve one or more advantages of the present invention. Although specific embodiments have been illustrated and described, it will be appreciated by one of ordinary skill in the art that any arrangement that is calculated to achieve the same purpose may be substituted for the specific embodiment shown. It is to be understood that the above description is intended to be illustrative and not restrictive. The application is intended to cover any variations of the invention. The scope of the invention includes any other embodiments and applications in which the above structures and methods may be used. The scope of the invention should therefore be determined with reference to the appended claims along with the scope of equivalence to which such claims are entitled.

It is emphasized that the abstract is provided to comply with 37 CFR. Section 1.72(b) requiring an abstract that will allow the reader to quickly ascertain the nature and gist of a technical disclosure. It is submitted with the understanding that it will not be used to interpret or limit the scope of meaning of the claims.

What is claimed is:

1. A circuit arrangement, comprising:
   a device comprising a closed signal path, the closed signal path connected to a first port, to a second port and a third port, the closed signal path comprising a directed signal flow with respect to a signal applied to one of the first, second and third port;
   a first circuit configured to be coupled to the third port, the first circuit comprising a plurality of paths;
   a tunable matching network connected to the second port and configured to be coupled to a second circuit, the tunable matching network having a single directional coupler configured to decouple a forward signal from a forward direction and a reflection signal from a reflection direction, and the matching network configured to calculate a reflection coefficient from the forward signal and the reflection signal, the reflection coefficient representing information about a match or mismatch with an impedance of the second circuit to an impedance of a selected path of the plurality of paths of the first circuit; and
   a power amplifier coupled to the first port.

2. The circuit arrangement of claim 1, wherein the power amplifier has an input and an output, and wherein the output of the power amplifier is directly coupled to the first port.

3. The circuit arrangement of claim 2, wherein the power amplifier has an impedance that matches the impedance of the selected path of the first circuit.

4. The circuit arrangement of claim 3, wherein the reflection coefficient further represents information about a match or mismatch with the impedance of the second circuit to the impedance of the power amplifier.

5. The circuit arrangement of claim 1, wherein the power amplifier comprises an amplifier chain comprising a plurality of amplifiers coupled together in series.

6. The circuit arrangement of claim 1, wherein the closed signal path comprises a circular conductor loop.

7. The circuit arrangement of claim 1, wherein the device comprises a magnetic material surrounding the closed signal path.

8. The circuit arrangement of claim 1, wherein the first port, the second port and the third port connected to the closed signal path are arranged with an angle of approximately 120° to each other.

9. The circuit arrangement of claim 1, wherein the single directional coupler of the tunable matching network comprises is configured to measure a signal portion of at least a reflected signal, wherein the single directional coupler is disposed between the second port and the circuit.

10. The circuit arrangement of claim 1, wherein an impedance of the matching network is tunable in response to a tuning signal.

11. The circuit arrangement of claim 10, wherein an impedance of the matching network is tunable in response to a tuning word, wherein the tuning word is derived by the reflected signal.

12. The circuit arrangement of claim 1 wherein the tunable matching network comprises a tunable element connected to a tuning input.

13. The circuit arrangement of claim 12, wherein the tunable element comprises at least a tunable capacitor or a tunable inductor.

* * * * *